US009478105B1

(12) United States Patent
Goldenthal et al.

(10) Patent No.: US 9,478,105 B1
(45) Date of Patent: Oct. 25, 2016

(54) DETECTING COLLISION BETWEEN OBJECTS

(75) Inventors: Rony Goldenthal, San Francisco, CA (US); Jonathan Hoof, Irvine, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 1009 days.

(21) Appl. No.: 12/405,669

(22) Filed: Mar. 17, 2009

Related U.S. Application Data

(60) Provisional application No. 61/141,630, filed on Dec. 30, 2008.

(51) Int. Cl.
*G07F 17/32* (2006.01)
*A63F 13/40* (2014.01)

(52) U.S. Cl.
CPC .................................. *G07F 17/3265* (2013.01)

(58) Field of Classification Search
CPC .... G07F 17/32; G07F 17/3265; A63F 13/08; A63F 13/10; G06T 2210/21
USPC ...................... 463/31, 34; 345/473, 619, 645
See application file for complete search history.

(56) References Cited

U.S. PATENT DOCUMENTS

| | | | | |
|---|---|---|---|---|
| 5,498,002 | A * | 3/1996 | Gechter | 463/31 |
| 6,049,341 | A * | 4/2000 | Mitchell et al. | 345/473 |
| 6,326,963 | B1 * | 12/2001 | Meehan | 345/419 |
| 6,535,215 | B1 | 3/2003 | DeWitt et al. | |
| 2006/0200314 | A1 * | 9/2006 | Ajioka et al. | 701/301 |
| 2007/0167203 | A1 * | 7/2007 | Yamada et al. | A63F 13/10 463/7 |
| 2007/0171221 | A1 * | 7/2007 | Miyamoto et al. | 345/419 |
| 2008/0158251 | A1 * | 7/2008 | Sathe et al. | 345/620 |
| 2009/0251469 | A1 * | 10/2009 | Cohen | G06T 13/20 345/473 |

OTHER PUBLICATIONS

Kiran S. Bhat et al., "Estimating Cloth Simulation Parameters from Video." Eurographics/SIGGRAPH Symposium on Computer Animation , The Eurographics Association, 2003, 15 pages.

Miller, Kurt. "Basic Collision Detection" [online] FLIPCODE.COM, 2000 [retrieved on Jul. 20, 2011]. Retrieved from the Internet: <URL: http://www.flipcode.com/archives/Basic_Collision_Detection.shtml>.

"Object/Object Intersection Page" [online]. Realtimerendering.com, 2008 [retrieved on Jul. 20, 2011]. Retrieved from the Internet: <URL: http://web.archive.org/web/20080711022616/http:/www.realtimerendering.com/intersections.html>.

(Continued)

*Primary Examiner* — Christine Enad

(74) *Attorney, Agent, or Firm* — Kilpatrick Townsend & Stockton LLP

(57) ABSTRACT

Among other disclosed subject matter, a computer program product is tangibly embodied in a computer-readable storage medium and includes instructions that when executed by a processor perform a method for detecting collision between objects. The method includes identifying a first edge of a first object, and a second edge of a second object, presented on a display, the second object associated with a transformation. The method includes performing an inverse of the transformation on the first object while not performing the transformation on the second object. The method includes generating an output on the display that indicates whether the first and second objects collide, the output based on performing the inverse of the transformation.

19 Claims, 7 Drawing Sheets

(56) References Cited

OTHER PUBLICATIONS

Bridson, et al. "Robust Treatment of Collisions, Contact and Friction for Cloth Animation", Proceedings of the ACM SIGGRAPH 2005 Courses (SIGGRAPH '05), 2005, 10 pages.

Provot, "Collision and Self Collision Handling in Cloth Model Dedicated to Design Garments" In Computer Animation and Simulation '97, 1997, pp. 177-189.

Raghupathi, et al. "QP-Collide: A New Approach to Collision Treatment" In Journées du Groupe de Travail Animation et Simulation (GTAS), 2006, pp. 91-101.

* cited by examiner

300

300A
(vx3(vy2(vz1-vz0)+vy1(vz0-vz2)+vy0(vz2-vz1))+vx2(vy3(vz0-vz1)+vy0(vz1-vz3)+vy1(vz3-vz0))+
vx0(vy3(vz1-vz2)+vy1(vz2-vz3)+vy2(vz3-vz1))+vx1(vy3(vz2-vz0)+vy2(vz0-vz3)+vy0(vz3-vz2)))$t^3$+

300B
(vx2vz1y0-vx3vz1y0-vx1vz2y0+vx3vz2y0+vx1vz3y0-vx2vz3y0-vx2vz0y1+vx3vz0y1+vx0vz2y1-vx3vz2y1-
vx0vz3y1+vx2vz3y1+vx1vz0y2-vx3vz0y2-vx0vz1y2+vx3vz1y2+vx0vz3y2-vx1vz3y2-
vx1vz0y3+vx2vz0y3+vx0vz1y3-vx2vz1y3-vx0vz2y3+vx1vz2y3+vy3(-vz0x1+vz2(x1-x0)+vz1(x0-x2)+vz0x2-
vx1z0+vx2z0+vx0z1-vx2z1-vx0z2+vx1z2)+vy1(-vz0x2+vz3(x2-x0)+vz2(x0-x3)+vz0x3-vx2z0+vx3z0+vx0z2-vx3z2-
vx0z3+vx2z3)+vy2(vz3(x0-x1)+vz0(x1-x3)+vz1(x3-x0)+vx1z0-vx3z0-vx0z1+vx3z1+vx0z3-vx1z3)+
vy0(vz3(x1-x2)+vz1x2-vz1x3+vz2(x3-x1)+vx2z1-vx3z1-vx1z2+vx3z2+vx1z3-vx2z3))$t^2$+

300C
(vz1x2y0-vz1x3y0+vx2z1y0-vx3z1y0-vx1z2y0+vx3z2y0-vz0x2y1+vz0x3y1-vz1x0y2+vz0x1y2-
vz0x3y2+vz1x3y2+vz3(x2(y1-y0)+x1(y0-y2)+x0(y2-y1))+vz1x0y3-vz0x1y3+vz0x2y3-vz1x2y3+
vz2(x3(y0-y1)+x0(y1-y3)+x1(y3-y0))+vy2x1z0-vy3x1z0-vy1x2z0+vy3x2z0+vy1x3z0-vy2x3z0-
vx2y1z0+vx3y1z0+vx1y2z0-vx3y2z0-vx1y3z0+vx2y3z0-vy2x0z1+vy3x0z1+vy0x2z1-vy3x2z1-vy0x3z1+vy2x3z1-
vx0y2z1+vx3y2z1+vx0y3z1-vx2y3z1+vy1x0z2-vy3x0z2-vy0x1z2+vy3x1z2+vy0x3z2-vy1x3z2+vx0y1z2-vx3y1z2-
vx0y3z2+vx1y3z2+(vy2(x0-x1)+vy0x1-vy0x2+vy1(x2-x0)+vx1y0-vx2y0-vx0y1+vx2y1+vx0y2-vx1y2)z3)t+

300D
x3(y2(z1-z0)+y1(z0-z2)+y0(z2-z1))+x2(y3(z0-z1)+y0(z1-z3)+y1(z3-z0))+x0(y3(z1-z2)+y1(z2-z3)+
y2(z3-z1))+x1(y3(z2-z0)+y2(z0-z3)+y0(z3-z2))

FIG. 3A

300'

300B'
$$((vx3vz2-vx2vz3)(y0-y1)+vy3(vz2(x1-x0)+vx2(z0-z1))+vy2(vz3(x0-x1)+vx3(z1-z0)))t^2+$$

300C'
$$(vz3(x2(y1-y0)+x1(y0-y2)+x0(y2-y1))+vz2(x3(y0-y1)+x0(y1-y3)+x1(y3-y0))-vx2y1z0+vx3y1z0-$$
$$vx3y2z0+vx2y3z0+vx2y0z1-vx3y0z1+vx3y2z1-vx2y3z1+vx3y0z2-vx3y1z2+vy3(x2(z0-z1)+$$
$$x0(z1-z2)+x1(z2-z0))-vx2y0z3+vx2y1z3+vy2(x3(z1-z0)+x1(z0-z3)+x0(z3-z1)))t+$$

300D'
$$x3(y2(z1-z0)+y1(z0-z2)+y0(z2-z1))+x2(y3(z0-z1)+y0(z1-z3)+y1(z3-z0))+x0(y3(z1-z2)+y1(z2-z3)+$$
$$y2(z3-z1))+x1(y3(z2-z0)+y2(z0-z3)+y0(z3-z2))$$

FIG. 3B

300"

300B" $\{$ (vy3vz2x1-vy2vz3x1-vx3vz2y1+vx2vz3y1+vx3vy2z1-vx2vy3z1)$t^2$+

300C" $\{$ (vz3x2y1-vz2x3y1-vx3z2y1-vx2z3y1-vz3x1y2+vz2x1y3-vy3x2z1+vy2x3z1+vx3y2z1-vx2y3z1+vy3x1z2-vy2x1z3)t+

300D" $\{$ x3y2z1-x2y3z1-x3y1z2+x1y3z2+x2y1z3-x1y2z3

FIG. 3C

DETECTING COLLISION BETWEEN OBJECTS

CLAIM OF PRIORITY

This application claims priority under 35 USC §119(e) to U.S. Patent Application Ser. No. 61/141,630, filed on Dec. 30, 2008, the entire contents of which are hereby incorporated by reference.

TECHNICAL FIELD

This document relates to detecting whether computer-based objects collide with each other.

BACKGROUND

In interactive electronics such as electronic games it is usually sought to improve the player experience to be more intense, flexible or realistic. One aspect that affects the user's experience is how fast the gaming program is executed in important situations, such as in an action scene of the game. This can present a dilemma for the game designer: making the game features complex and very lifelike can require too much processing for a real-time application, but on the other hand, eliminating features that are too demanding can make the game less interesting.

For example, one form of collision detection that can be performed is referred to as continuous time detection. It is sometimes used in simulations because it has a relatively high degree of accuracy. However, the time required to perform continuous time detection can be too long for use in a high-paced interactive electronic game.

SUMMARY

The invention relates to detecting collision between objects.

In a first aspect, a computer program product is tangibly embodied in a computer-readable storage medium and includes instructions that when executed by a processor perform a method for detecting collision between objects. The method includes identifying a first edge of a first object, and a second edge of a second object, presented on a display, the second object associated with a transformation. The method includes performing an inverse of the transformation on the first object while not performing the transformation on the second object. The method includes generating an output on the display that indicates whether the first and second objects collide, the output based on performing the inverse of the transformation.

Implementations can include any or all of the following features. The transformation can be a rigid transformation and the output can be based on performing an inverse of the rigid transformation. The method can be performed in an electronic game substantially in real time such that real-time collision detection is achieved. The output can indicate that the first and second objects undergo a collision due to the transformation, and the output can further include at least one of: a visual result of the collision involving at least one of the first and second objects; and a logical result of the collision. The first object can also be associated with another transformation in addition to the inverse of the transformation, and each of the other transformation and the inverse of the transformation can be performed on the first object to generate the output. Each of the first and second objects can include at least one selected from: a one dimensional element, a two dimensional element and a three dimensional element. Identifying the first and second edges can include identifying first endpoints of the first edge and second endpoints of the second edge; forming a plane of three of the first and second endpoints, with one of the first and second endpoints being a remaining endpoint, the plane and the remaining endpoint moving during a time step; and wherein generating the output comprises determining whether the remaining endpoint enters the plane. The output can be generated using a polynomial regarding the first and second edges. A necessary condition for deciding whether the first and second objects collide can be that the polynomial equals zero for an applicable time-variable value. The necessary condition can be satisfied, and the method can further include performing a proximity detection as a sufficient condition for deciding whether the first and second objects collide. Performing the inverse of the transformation on the first object while not performing the transformation on the second object can correspond to a reduction in polynomial degree of the polynomial. The method can further include performing an origin transformation of the first and second edges, the origin transformation causing one endpoint of the second edge to coincide with an origin in a coordinate system based on which the polynomial is defined.

In a second aspect, a computer program product is tangibly embodied in a computer-readable storage medium, the computer program product including instructions that, when executed, generate on a display device a graphical user interface for a moving object. The graphical user interface includes a representation of a first object having a first edge. The graphical user interface includes a representation of a second object having a second edge, the second object associated with a transformation. The graphical user interface is configured to present an output that indicates whether the first and second objects collide, the output based on performing an inverse of the transformation on the first object while not performing the rigid transformation on the second object. Implementations can include any or all of the following features. The graphical user interface can be generated in an electronic game substantially in real time such that real-time collision detection is achieved. The output can indicate that the first and second objects undergo a collision due to the transformation, and the output can further include at least one of: a visual result of the collision involving at least one of the first and second objects; and a logical result of the collision.

In a third aspect, a gaming device includes a processor, an input device, a display device showing representations of a first object having a first edge and a second object having a second edge, the second object associated with a transformation, and a game program responsive to the input device and containing instructions to the processor to present an output on the display device, the output indicating whether the first and second objects collide and being based on performing an inverse of the transformation while not performing the transformation on the second object.

Implementations can include any or all of the following features. The transformation can be a rigid transformation and the output can be based on performing an inverse of the rigid transformation. The output can be generated substantially in real time such that real-time collision detection is achieved. The output can indicate that the first and second objects undergo a collision due to the transformation, and the output can further include at least one of: a visual result of the collision involving at least one of the first and second objects; and a logical result of the collision.

Implementations can provide any or all of the following advantages. Collision detection can be improved. Real-time collision detection for a game program can be provided by reducing a polynomial degree in the calculations. Complexity of a collision polynomial can be further reduced by transforming objects to an origin of a coordinate system.

The details of one or more embodiments are set forth in the accompanying drawings and the description below. Other features and advantages will be apparent from the description and drawings, and from the claims.

DESCRIPTION OF DRAWINGS

FIGS. 3A-C show example polynomials that can be used to determine whether objects collide.

Like reference symbols in the various drawings indicate like elements.

DETAILED DESCRIPTION

Figure 1:
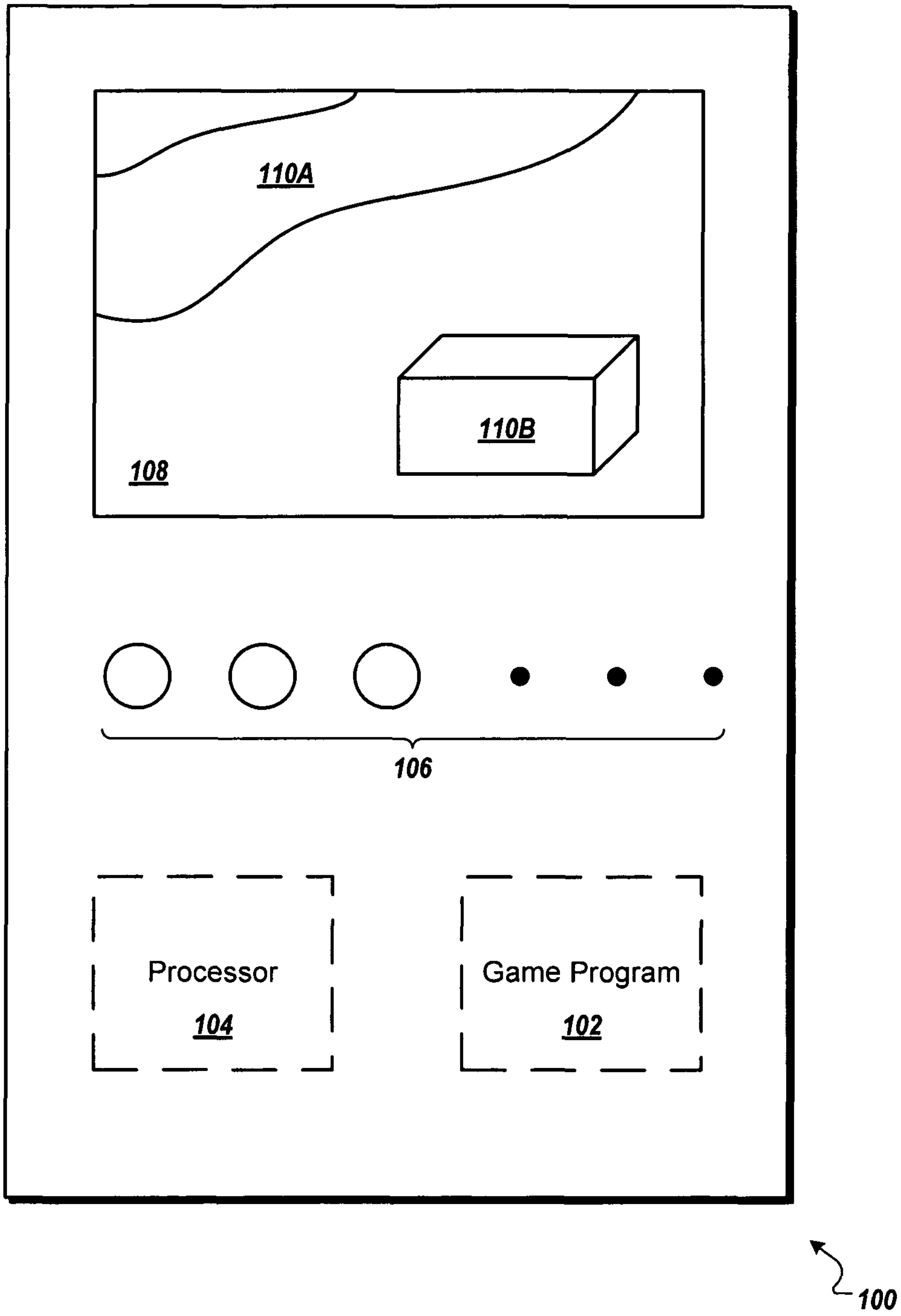
FIG. 1 shows an example of a gaming device that can perform collision detection.

FIG. 1 shows an example of a gaming device 100 that can perform collision detection. In some implementations, the device 100 can perform the collision detection substantially in real time, as a game is being played. The gaming device can be implemented according to any of multiple types of gaming system or platform. The gaming device can be an essentially portable and self-contained device, such as a handheld gaming device or a cell phone, or it can include a personal computer or other console intended mostly for stationary use, to name just a few examples.

The gaming device 100 includes one or more game programs 102. The game program 102 can be created using any of multiple programming languages and can be stored in a memory or drive located in the gaming device. As another example, the game program can be stored on a removable computer-readable medium, such as a memory card, flash memory, CD or DVD.

The gaming device includes one or more processors 104. The processor can execute instructions stored in the game program 102 for playing one or more games. In some implementations, the processor 104 can also perform other functions such as running an operative system and/or facilitating communication (e.g., voice transmission) using the device 100. Any of multiple types of processors can be used.

The gaming device can include one or more input devices 106. In some implementations, the input device(s) are configured for a user to participate in a game generated using the game program 102. For example, the user can control one or more game aspects, such as motion of a computer-generated object, using the input device(s). The input devices can in some implementations also perform one or more other functions, such as managing voice or data communication or information processing.

The gaming device 100 includes one or more display devices 108. In some implementations, visual content generated using the game program 102 can be output on the display device 108. For example, a game played on the gaming device can include a sequence of screens that can at least partly be manipulated by the user in playing the game. Any of multiple kinds of display devices can be used.

In the illustrated implementation, the display device 108 currently shows an object 110A and an object 110B. For example, the game program can define the object 110A as a tool held by a character representing the player, for example a whip held by a character.

The object 110B can be anything else in the virtual environment created by the game, such as another character, an item, or a structure. In the above example, the game may be defined so that the player can manipulate the character to strike at various items visible on the screen, for example enemy characters, stationary objects or moving objects. Accordingly, the further development of the game session can depend on whether the object 110A collides with the object 110B, for example, whether the character hits something with the whip.

The objects 110A and B can be generated using any modeling technique. In some implementations, the edge for the first and/or second object can come from one dimensional elements such as a whip or hair; two dimensional elements such as a polygonal mesh, a triangle soup, or a convex hull; or a three dimensional element such as a tetrahedron. Other shapes and/or configurations can be used.

The object 110B can undergo transformation in the game. In some implementations, the transformation is rigid, for example such that the object 110B is subject to only translation or rotation. That is, the object 110B may not be deformed as part of the translation. Transformation of an item in the game can be effectuated by applying the transformation to the object representing the item. For example, an object can be transformed to move in an arbitrary direction. Movement can be caused by any of multiple factors. For example, the player can cause the character to move the object 110A. As another example, the object 110B can move due to a rigid body simulation or based on kinematics defined by an animation system.

Example of collision detection will be described below. If a collision is detected, it can cause one or more results in the gaming device 100. For example, if the object 110A strikes its target, the object 110B can recoil or otherwise change its direction of movement as a result of the impact. Such a result can be visible on the screen in some implementations. As another example, a logical result can occur in the game, such as by adding or deducting the player's points or by any triggering any other event defined in the gaming device 100.

Figure 2A:
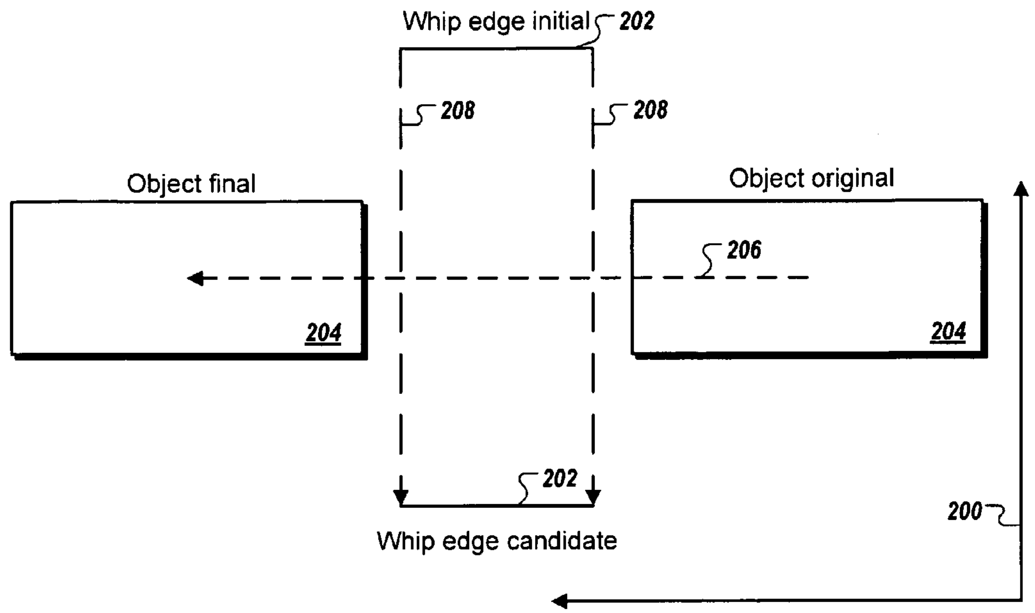
FIGS. 2A-C schematically show example transformation of objects.
Figure 2B:
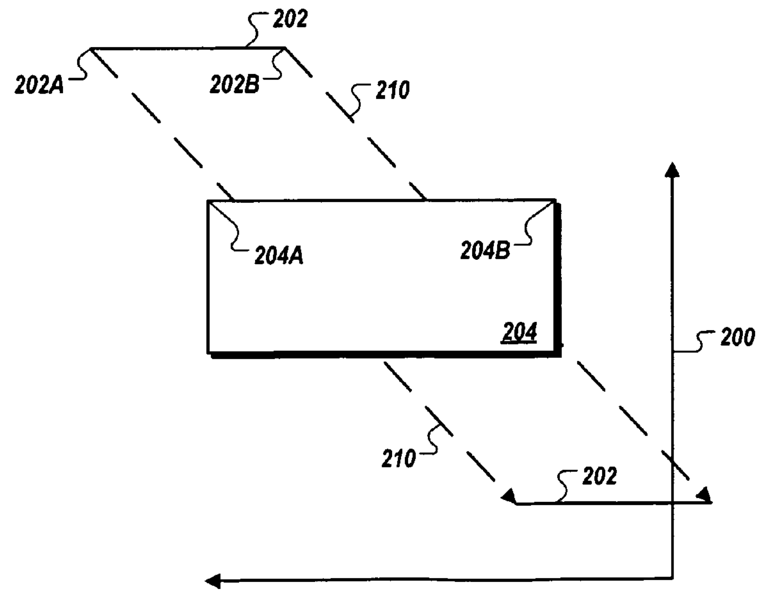
Figure 2C:
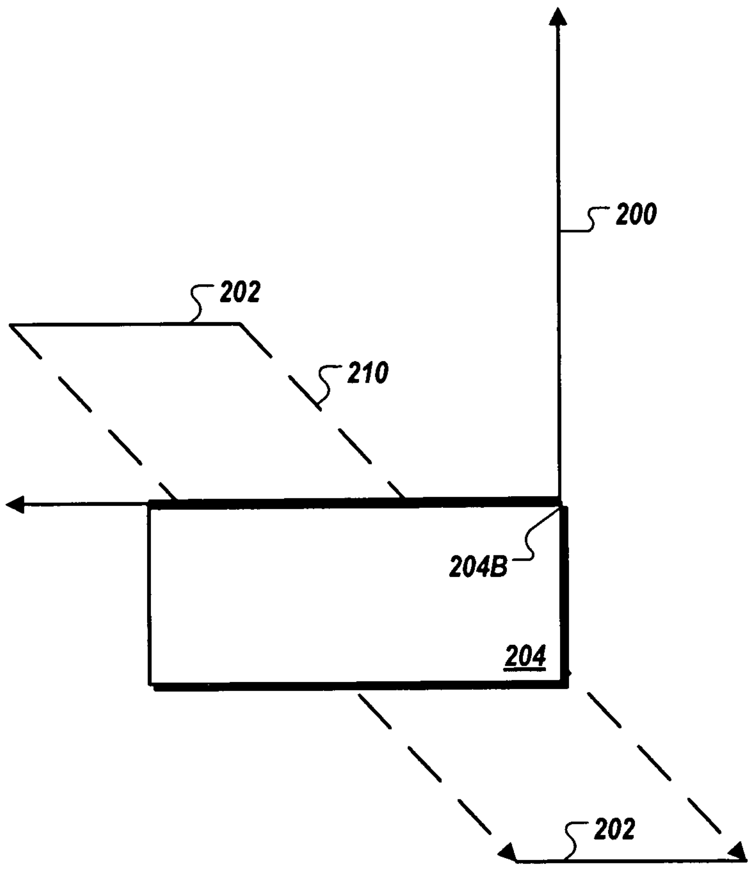

FIGS. 2A-C schematically show example transformation of objects. A coordinate system 200 is schematically illustrated to indicate at least two dimensions in which objects can be located and move. Here, collision detection is to be performed between a portion of a whip and a moving object, along the lines of the example described above. Particularly, a whip edge 202 and an object 204 have been identified. For example, the whip and the object 204 may consist of many vertices joined by edges, and a pruning can be performed to eliminate or ignore from consideration pairs of a whip edge and an object edge that will not collide. That is, collision detection in such examples is performed only for pairs of edges that may potentially collide.

Collision detection can be performed for each time frame defined by the game. For example, the game can be configured so that "time" flows in increments of arbitrary length. That is, at the beginning of the time frame any object may be in a first specific location and at the end of the time frame the object may have been translated to a second position. Thus, objects in the game can move in the virtual space over time.

Here, the object 204 is about to undergo a translation 206 in the present time frame. That is, the object has an original position (labeled "Object original") and will be rigidly translated to a final position (labeled "Object final"). In the same time frame, the whip will undergo translation as well. Here, a transformation 208 is defined as being applied to each endpoint of the whip edge 202, moving the whip edge 202 from an initial position (labeled "Whip edge initial") to a candidate position (labeled "Whip edge candidate"). The candidate position can represent the position of the whip at the end of the time, provided that no collision occurs. However, if a collision is detected, the final position of the whip edge 202 may be different from the candidate position.

It is noted that the whip edge 202 and the object 204, as well as the transformations 206 and 208, are here shown in a two-dimensional plane for simplicity. In some implementations, collision detection can be performed between objects moving in more than two dimensions.

To detect whether the whip edge 202 collides with any edge of the object 204, an inverse transformation can be applied to the whip edge 202 while making the object 204 static. For example, FIG. 2B shows the object 204 not moving relative to the coordinate system 200. That is, for purposes of collision detection, the translation 206 is not applied to the object 204, which consequently remains in the original position during the time frame. Rather, an inverse of the transformation 206 is applied to the whip edge 202. For example, if the object 204 were initially defined as moving to the left toward the whip edge 202, in the inverse transformation the object 204 can be held stationary and the whip edge 202 can instead move to the right toward the object 204. In this example, both the inverse of the transformation 206, and the transformation 208 are applied to the whip edge 202. The result is a whip-edge transformation 210.

To determine whether the whip edge 202 collides with the object 204, one or more tests can be performed. Such tests can use the endpoints of defined edges. For example, the whip edge 202 can be defined by endpoints 202A and 202B. Similarly, the edge of the object 204 can be defined by endpoints 204A and 204B. In some implementations, a vertex-face test and an edge-edge test are performed. The vertex-face test can determine whether either or both of the endpoints 202A-B cross the interior of a triangle that defines the object 204. For example, the edge between the object endpoints 204A-B can form one side of a triangle, and if the endpoint 202A or B passes through such a triangle, the vertex-face test is met.

In some implementations, collision detection can be performed for the broader case of collision between any two edges. That is, such implementations may not be restricted to collision between an a rigidly deforming edge and another edge, bur rather both edges can change their length in addition to rotation and translation. Performing collision detection requires computing the inverse of the transformation. The computational cost involved for computing the inverse of a rigid transformation are substantially lower for a rigid transformation than for a non-rigid transformation. In some implementations, however, this additional expense may offset the gains from the simplification in the polynomial solution.

The edge-edge test can determine whether the whip edge 202 crosses the edge defined by the endpoints 204A-B. In some implementations, this test involves determining whether the two edges become coplanar during the current time frame. For example, three of the four endpoints 202A-B and 204A-B can be selected, which forms a plane defined by the three points. The fourth point, by its distance from that plane, defines a tetrahedron having a volume depending on the distance and the location of the other three points. As the edges move, the volume of the tetrahedron will change. If the fourth endpoint (i.e., the one not used in defining the plane) is on the same plane as the other three endpoints, the volume is equal to zero and the edge-edge test is satisfied. For example, the edge-edge test can be satisfied in the current time frame if, say, the whip edge endpoint 202A enters a plane defined by the endpoints 202B and 204A-B.

In some implementations, the edge-edge test is a necessary but not sufficient condition for detecting a collision. That is, after the edge-edge test is satisfied, one or more other tests can be performed to determine whether a collision has occurred. For example, a proximity detection check can be performed regarding the edges involved. Such a test can then be considered a sufficient condition for collision detection.

In some implementations, the edge of any object can be moved to further simplify calculations. For example, FIG. 2C shows that the object 204 can be moved to locate the endpoint 204B at an origin of the coordinate system 200. This can be done by redefining the variable(s) of the object 204, or by relocating the coordinate system 200, to name two examples. The whip-edge transformation 210 can be performed on the whip edge 202 while keeping the object 204 static with its corner at the origin.

The whip in the current description is mentioned as an example. In some implementations, other shapes can be used, for example for collision between cloth and rigid objects.

FIGS. 3A-C show example polynomials that can be used to determine whether objects collide. In FIG. 3A, a third-degree polynomial 300 is shown. The polynomial 300 is expressed using a variable t for time and here includes four terms 300A-D. The terms 300A-C include factors $t^3$, $t^2$ and t, respectively. The term 300D does not depend on t. Each of the terms 300A-D uses position and/or velocity coordinates for each of four points referred to as points 0, 1, 2 and 3, respectively. For example, the four points in the polynomial 300 can correspond to the endpoints 202A-B and 204A-B, respectively. That is, x-values in the terms represent a location in an x-dimension of a coordinate system and are called x0, x1, x2 or x3 depending on which point the refer to. Similarly, values y0-y3 and z0-z3 represent locations in y- and z-dimensions for the respective points. Velocity coordinates are called vx0, vx1, vx2 and vx3 for the velocities in the x-dimension of the respective four points. Similarly, velocity coordinates vy0-vy3 and vz0-vz3 refer to velocities in the y- and z-dimensions for the respective points.

To perform collision detection with the transformation 206 applied to the object 204 and the transformation 208 applied to the whip edge 202 (e.g., as illustrated in FIG. 2A), the polynomial 300 should be solved. That is, a value for t during the current time frame should be found so that the polynomial 300 equals zero. A root of the polynomial 300 that corresponds to a time outside the present time can be ignored or rejected.

However, the polynomial 300 can be simplified by instead performing an inverse transformation, for example as described with reference to the whip-edge transformation 210 above. FIG. 3B shows a polynomial 300' after simplification, now containing a term 300B' for the $t^2$ variable and a term 300C' for the t variable. The term 300A is not included in the polynomial 300' and the t-independent terms 300D' and 300D may be identical. Accordingly, the polynomial 300' can have a reduced degree compared to the polynomial 300 by keeping the rigid object 204 static and instead applying an inverse of the transformation 206 to the whip edge 202. The reduced complexity can lower costs in developing and programming the game program 102, and can make the collision detection sufficiently quick to be evaluated in real time while the game is being played.

Further simplification can be done in some implementations. For example, the endpoint of an edge can be relocated to the origin of a coordinate system to obtain a polynomial 300" shown in FIG. 3C, in analogy with the example described regarding FIG. 2C. Here, the polynomial 300" contains a term 300B" for the $t^2$ variable, a term 300C" for the t variable, and a t-independent term 300D". In an implementation, a root of the polynomial 300" can be sought in the present time frame to determine whether objects collide. Accordingly, more cost reduction in development/programming and quicker collision detection in real time can be achieved.

Figure 4:
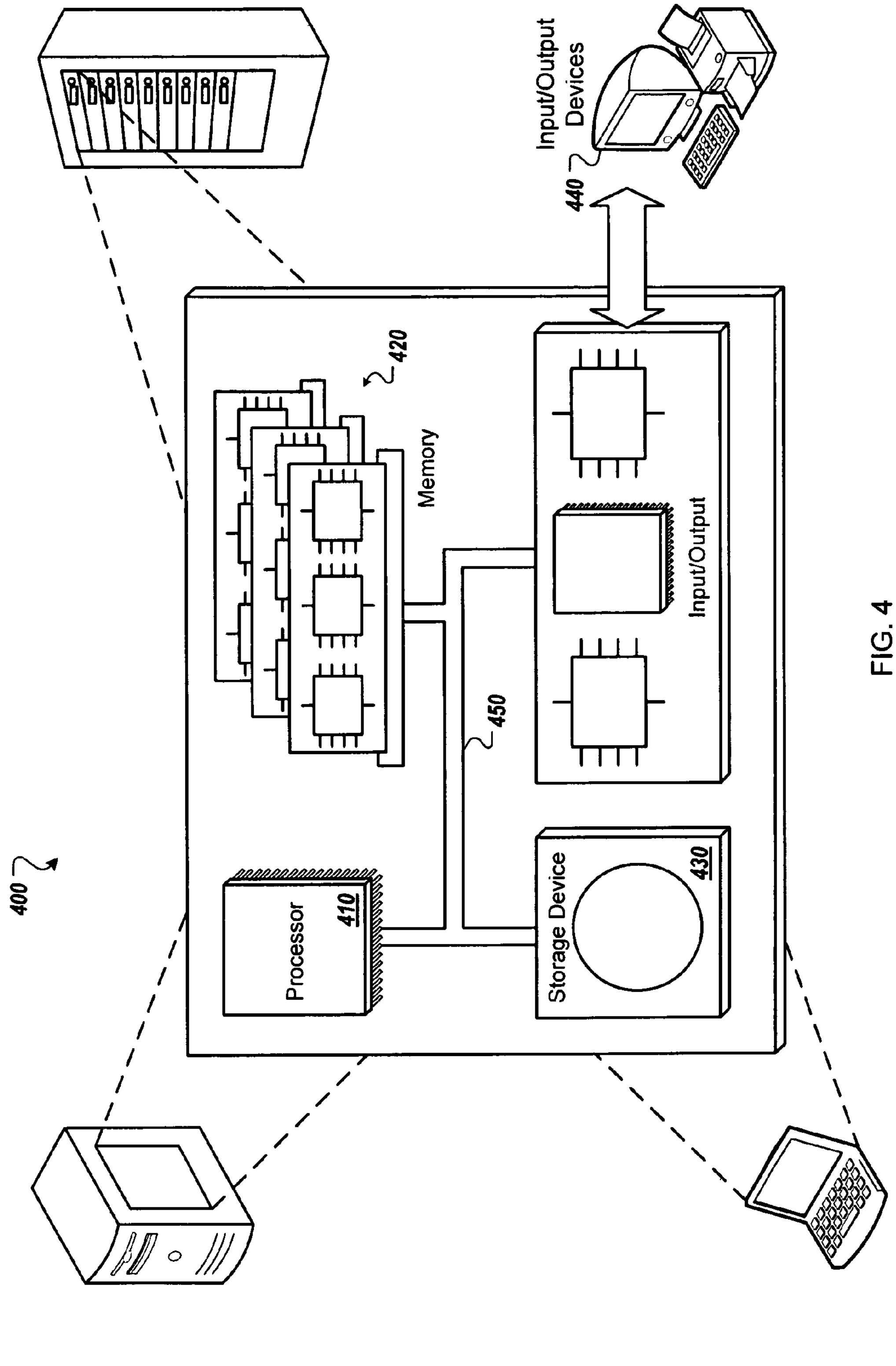
FIG. 4 is a block diagram of a computing system that can be used in connection with computer-implemented methods described in this document.

FIG. 4 is a schematic diagram of a generic computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer program product tangibly embodied in a non-transitory computer-readable storage medium and comprising instructions that when executed by a processor perform a method for detecting collision between objects, the method comprising:

identifying a first edge of a first object, and a second edge of a second object, presented on a display, the first object associated with a first transformation, the first transformation including movement of endpoints of the first edge of the first object in a first direction, the second object associated with a second transformation, the second transformation including movement of endpoints of the second edge of the second object in a second direction;

determining whether the first and second objects collide by performing the first transformation and an inverse of the second transformation on the first object while not performing the second transformation on the second object, and by computing a polynomial using position coordinates of the endpoints of the first edge and position coordinates of the endpoints of the second edge, the position coordinates of the endpoints of the first edge resulting from the first transformation and the inverse of the second transformation being performed on the first object, wherein the inverse of the second transformation includes movement of the endpoints of the first edge of the first object in a third direction, the third direction being opposite of the second direction; and generating an output on the display that indicates whether the first and second objects collide.

2. The computer program product of claim 1, wherein the transformation is a rigid transformation and wherein the output is based on performing an inverse of the rigid transformation.

3. The computer program product of claim 1, wherein the method is performed in an electronic game substantially in real time such that real-time collision detection is achieved.

4. The computer program product of claim 1, wherein the output indicates that the first and second objects undergo a collision due to the transformation, and wherein the output further comprises at least one of:

a visual result of the collision involving at least one of the first and second objects; and a logical result of the collision.

5. The computer program product of claim 1, wherein the first object is associated with another transformation in addition to the inverse of the transformation, and wherein each of the other transformation and the inverse of the transformation is performed on the first object to generate the output.

6. The computer program product of claim 1, wherein each of the first and second objects includes at least one selected from:

a one dimensional element, a two dimensional element and a three dimensional element.

7. The computer program product of claim 1, wherein identifying the first and second edges comprises:

identifying first endpoints of the first edge and second endpoints of the second edge;

forming a plane of three of the first and second endpoints, with one of the first and second endpoints being a remaining endpoint, the plane and the remaining endpoint moving during a time step; and wherein generating the output comprises determining whether the remaining endpoint enters the plane.

8. The computer program product of claim 1, wherein the polynomial is further computed using velocity coordinates of the endpoints of the first edge and velocity coordinates of the endpoints of the second edge.

9. The computer program product of claim 1, wherein a necessary condition for deciding whether the first and second objects collide is that the polynomial equals zero for an applicable time-variable value.

10. The computer program product of claim 9, wherein the necessary condition is satisfied, further comprising performing a proximity detection as a sufficient condition for deciding whether the first and second objects collide.

11. The computer program product of claim 1, wherein performing the inverse of the transformation on the first object while not performing the transformation on the second object corresponds to a reduction in polynomial degree of the polynomial.

12. The computer program product of claim 11, further comprising:

performing an origin transformation of the first and second edges, the origin transformation causing one endpoint of the second edge to coincide with an origin in a coordinate system based on which the polynomial is defined.

13. A computer program product tangibly embodied in a non-transitory computer-readable storage medium, the computer program product including instructions that, when executed, generate on a display device a graphical user interface for a moving object, the graphical user interface comprising:

a representation of a first object having a first edge, the first object associated with a first transformation, the first transformation including movement of endpoints of the first edge of the first object in a first direction; and a representation of a second object having a second edge, the second object associated with a second transformation, the second transformation including movement of endpoints of the second edge of the second object in a second direction; and wherein the graphical user interface is configured to present an output that indicates whether the first and second objects collide, wherein whether the first and second objects collide is determined by performing the first transformation and an inverse of the second transformation on the first object while not performing the second transformation on the second object and by computing a polynomial using position coordinates of the endpoints of the first edge and position coordinates of the endpoints of the second edge, the position coordinates of the endpoints of the first edge resulting from the first transformation and the inverse of the second transformation being performed on the first object, wherein the inverse of the second transformation includes movement of the endpoints of the first edge of the first object in a third direction, the third direction being opposite of the second direction.

14. The computer program product of claim 13, wherein the graphical user interface is generated in an electronic game substantially in real time such that real-time collision detection is achieved.

15. The computer program product of claim 13, wherein the output indicates that the first and second objects undergo a collision due to the transformation, and wherein the output further comprises at least one of:

a visual result of the collision involving at least one of the first and second objects; and a logical result of the collision.

16. A gaming device comprising:

a processor;

an input device;

a display device showing representations of a first object having a first edge and a second object having a second edge, the first object associated with a first transformation, the first transformation including movement of endpoints of the first edge of the first object in a first direction, the second object associated with a second transformation, the second transformation including movement of endpoints of the second edge of the second object in a second direction; and a game program responsive to the input device and containing instructions to the processor to present an output on the display device, the output indicating whether the first and second objects collide, wherein whether the first and second objects collide is determined by performing the first transformation and an inverse of the second transformation on the first object while not performing the second transformation on the second object and by computing a polynomial using position coordinates of the endpoints of the first edge and position coordinates of the endpoints of the second edge, the position coordinates of the endpoints of the first edge resulting from the first transformation and the inverse of the second transformation being performed on the first object, wherein the inverse of the second transformation includes movement of the endpoints of the first edge of the first object in a third direction, the third direction being opposite of the second direction.

17. The gaming device of claim 16, wherein the transformation is a rigid transformation and wherein the output is based on performing an inverse of the rigid transformation.

18. The gaming device of claim 16, wherein the output is generated substantially in real time such that real-time collision detection is achieved.

19. The gaming device of claim 16, wherein the output indicates that the first and second objects undergo a collision due to the transformation, and wherein the output further comprises at least one of:

a visual result of the collision involving at least one of the first and second objects; and a logical result of the collision.

* * * * *